Patented June 6, 1933

1,912,680

UNITED STATES PATENT OFFICE

FREDERICK W. ZONS, OF NEW YORK, N. Y.

LUMINESCENT TUBE AND PROCESS OF MANUFACTURING SAME

No Drawing.    Application filed May 21, 1929. Serial No. 364,947.

In my copending application, Serial No. 339,735 I have described and claimed a process of cleaning up water vapors in a luminescent tube. As is there made clear, this impurity even when too slight in amount to affect the color of the luminous atmosphere within the tube, nevertheless attacks the material of the electrode and causes rapid blackening of the glass of the tube. The said copending application describes and claims a method of disposing of the water vapor which consists in first supplying an additional quantity of oxygen to make it certain that all the hydrogen present will combine with such oxygen to form water vapor and then to dispose of the water vapor by providing a material that has a strong affinity for water vapor. The material specified in the aforesaid application is phosphoric anhydride.

The present invention is a specific change in the invention described and claimed in said application. I have found that a number of metallic oxides have such a strong affinity for water vapor that they may be used with advantage to take up the water vapor which forms a very active and deleterious element in a luminescent tube. Such oxides indeed have so pronounced an affinity for water vapor that it is not practicable to introduce them into the tube as oxides for the reason that while they are exposed in the open air they are likely to take up so much water vapor as to lose their effectiveness when introduced into the tube.

By the method of the present invention, I introduce metallic compounds into the tube and so treat them when in place that they form or may be reduced to the oxides. As examples of the metallic compounds which I have found effective to accomplish the object of the present invention, I may enumerate among others, barium nitrate $Ba(NO_3)_2$ barium nitrite, $Ba(NO_2)_2$, potassium nitrate $KNO_3$. An aqueous solution of these materials may be formed and dropped in sufficient quantity, preferably within the electrode chamber or at any other place that may be desired within the tube. Care, however, should be taken not to place the solution upon the electrode itself as the resulting oxide produced therefrom will suffer in efficiency when hot. When this solution has dried, it is heated in any convenient manner to decompose the same. It is to be observed that when the initial metallic compound from which the solution is made contains oxygen, the decomposition is not effected until the tube is exhausted.

From the compounds above mentioned upon decomposition effected in the manner above described, there would remain within the tube barium oxide (BaO) potassium oxide $K_2O$ or the like.

I may, also, instead of introducing the compound in an aqueous solution, introduce it in any other convenient manner as for instance, in solid form. It will be obvious also, that my invention is capable of many variations without departing from the scope thereof and I include all such variations as part thereof.

What I claim is:—

1. The process of removing water vapor from a luminescent tube which consists in introducing into said tube during manufacture, but not on the electrodes, a heat decomposable nitrogen-oxygen salt of an alkali or alkaline earth metal; and heating said tube and said salt during the manufacture of the tube and converting the salt into the oxide of said alkali or alkaline earth metal.

2. The process of removing water vapor from a luminescent tube which consists in introducing into said tube during manufacture, but not on the electrodes, barium nitrate; and heating said tube and said salt during the manufacture of the tube and converting the salt into an oxide of barium.

In witness whereof, I have set my hand hereto this 26th day of April, 1929.

FREDERICK W. ZONS.